United States Patent
Alu

(10) Patent No.: US 9,933,090 B2
(45) Date of Patent: Apr. 3, 2018

(54) PIPE RETAINER

(71) Applicant: AIR INTERNATIONAL (US) INC., Auburn Hills, MI (US)

(72) Inventor: Calogero Alu, Shelby Township, MI (US)

(73) Assignee: Air International, Inc., Auburn Hills, MI (US)

( * ) Notice: Subject to any disclaimer, the term of this patent is extended or adjusted under 35 U.S.C. 154(b) by 86 days.

(21) Appl. No.: 14/818,413

(22) Filed: Aug. 5, 2015

(65) Prior Publication Data

US 2016/0039264 A1 Feb. 11, 2016

Related U.S. Application Data

(60) Provisional application No. 62/033,387, filed on Aug. 5, 2014.

(51) Int. Cl.
| | |
|---|---|
| *A62C 13/76* | (2006.01) |
| *F16L 3/237* | (2006.01) |
| *F16L 3/00* | (2006.01) |
| *F16L 3/10* | (2006.01) |
| *B60H 1/00* | (2006.01) |

(52) U.S. Cl.
CPC .......... *F16L 3/237* (2013.01); *B60H 1/00571* (2013.01); *F16L 3/003* (2013.01); *F16L 3/1091* (2013.01)

(58) Field of Classification Search
CPC .................................................... F16L 3/2235
See application file for complete search history.

(56) References Cited

U.S. PATENT DOCUMENTS

| | | | | | |
|---|---|---|---|---|---|
| 1,139,748 | A | * | 5/1915 | Beatty | H01B 17/24 174/157 |
| 3,469,863 | A | * | 9/1969 | Riester | F16L 37/56 277/322 |
| 3,526,934 | A | * | 9/1970 | Owen, Sr. | F16B 7/0433 138/106 |
| 4,199,070 | A | * | 4/1980 | Magnussen, Jr. | A47B 73/006 138/112 |
| 4,769,876 | A | * | 9/1988 | Platt | F16L 3/2235 24/335 |
| 4,878,696 | A | * | 11/1989 | Walker | F16L 3/2235 285/143.1 |
| 4,900,065 | A | * | 2/1990 | Houck | F16L 37/098 285/124.4 |
| D311,487 | S | * | 10/1990 | Platt | D8/356 |
| 5,029,782 | A | * | 7/1991 | Andre | F16L 3/2235 248/68.1 |
| 5,205,520 | A | * | 4/1993 | Walker | F16L 3/2235 248/68.1 |
| 5,234,185 | A | * | 8/1993 | Hoffman | F16L 5/14 248/56 |

(Continued)

*Primary Examiner* — Kimberly T Wood
(74) *Attorney, Agent, or Firm* — Carlson, Gaskey & Olds P.C.

(57) ABSTRACT

A pipe retainer assembly according to an exemplary aspect of the present disclosure includes, among other things, a mount including one of a slot and a projection, and a pipe retainer including a latch and the other of a slot and a projection. The slot is received in the projection and the latch is engaged with the mount. The assembly further includes a fluid conduit held in place by the mount and the pipe retainer. A method is also disclosed.

4 Claims, 2 Drawing Sheets

(56) References Cited

U.S. PATENT DOCUMENTS

| | | | | |
|---|---|---|---|---|
| 5,261,633 A * | 11/1993 | Mastro | F16L 3/18 248/68.1 |
| 5,556,138 A * | 9/1996 | Nakajima | F16L 39/00 285/124.4 |
| 5,987,709 A * | 11/1999 | Chou | A01K 27/005 24/115 F |
| 5,996,945 A * | 12/1999 | Coles | F16L 3/2235 24/16 R |
| 6,488,314 B1 * | 12/2002 | Hutter | F16L 31/00 285/124.1 |
| 6,540,531 B2 * | 4/2003 | Syed | H01R 9/0524 174/68.3 |
| 6,545,220 B2 * | 4/2003 | Syed | H02G 3/0481 174/75 C |
| 6,802,512 B2 * | 10/2004 | Muller | H02G 15/013 174/653 |
| 6,866,300 B2 * | 3/2005 | Hayes | F16L 39/00 285/124.2 |
| 6,868,580 B1 * | 3/2005 | Diggs | F16L 3/2332 16/2.1 |
| 7,411,128 B2 * | 8/2008 | Drotleff | H02G 15/013 174/74 R |
| 7,464,966 B2 * | 12/2008 | Miyajima | F16L 5/10 248/56 |
| 7,553,102 B2 * | 6/2009 | Dilworth | F16B 2/06 403/188 |
| 8,430,365 B2 * | 4/2013 | Benoit | F16L 5/027 248/49 |
| 8,678,325 B2 | 3/2014 | Arzate-Engels | |
| 2002/0088644 A1 * | 7/2002 | Burland | B60R 16/0207 174/135 |
| 2002/0117850 A1 * | 8/2002 | Wood | B60H 1/00571 285/124.1 |
| 2011/0284285 A1 * | 11/2011 | Miura | H02G 3/32 174/70 R |
| 2012/0009012 A1 * | 1/2012 | Allenbach | F16L 3/2235 403/344 |
| 2012/0280092 A1 * | 11/2012 | Barre | F16L 3/237 248/68.1 |
| 2014/0174582 A1 | 6/2014 | Kehimkar et al. | |
| 2014/0224942 A1 * | 8/2014 | Railsback | F16L 3/2235 248/68.1 |
| 2015/0192225 A1 * | 7/2015 | Vo | F16L 3/1091 248/67.5 |

* cited by examiner

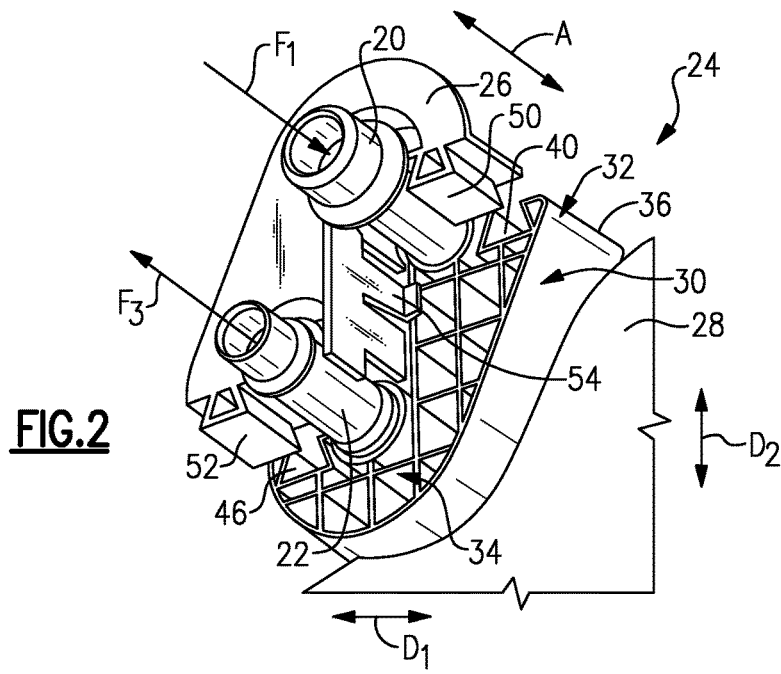
FIG.2
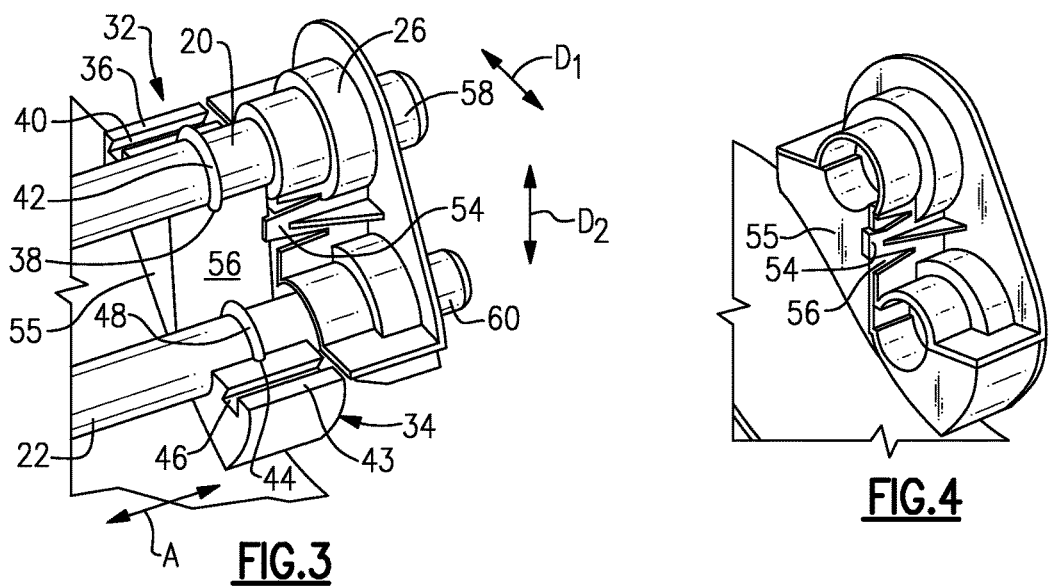
FIG.3
FIG.4
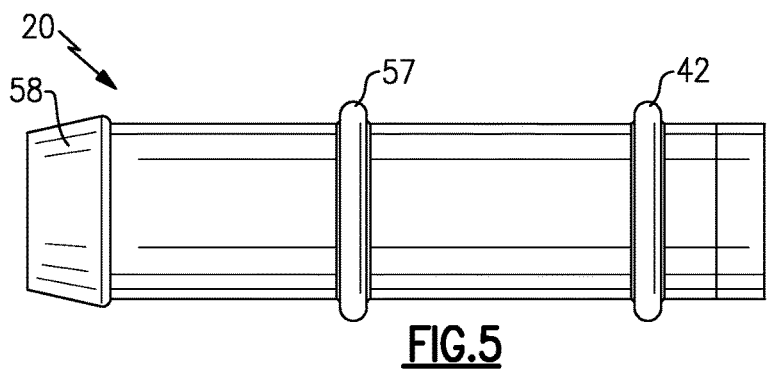
FIG.5

PIPE RETAINER

RELATED APPLICATIONS

This application claims the benefit of U.S. Provisional Application No. 62/033,387, filed Aug. 5, 2014, the entirety of which is herein incorporated by reference.

BACKGROUND

Modern vehicles include heating, ventilation, and air conditioning (HVAC) systems for improving passenger comfort.

In general, vehicle air conditioning systems include an evaporator heat exchanger in communication with a compressor and a condenser. A compressor receives heated refrigerant from the evaporator and compresses it into a high pressure gas for communication to the condenser. The condenser then cools the gaseous refrigerant into a cool liquid refrigerant for communication back to the evaporator. A blower forces air across the evaporator, providing cooled air into the passenger compartment.

A vehicle heating system includes a heater core that receives hot engine coolant from the engine. A blower forces air across the heater core, providing heated air to the passenger compartment. The system may also include one or more conduits, which are retained in place by a conduit retainer (or, pipe retainer), such as a bracket. The conduit retainer is typically fastened to the vehicle by way of a fastener (e.g., a screw or bolt).

SUMMARY

A pipe retainer assembly according to an exemplary aspect of the present disclosure includes, among other things, a mount including one of a slot and a projection, and a pipe retainer including a latch and the other of a slot and a projection. The slot is received in the projection and the latch is engaged with the mount. The assembly further includes a fluid conduit held in place by the mount and the pipe retainer.

A pipe retainer according to an exemplary aspect of the present disclosure includes, among other things, a first projection for engagement with a first slot in a mount, a second projection for engagement with a second slot in the mount, and a latch for engagement with a wall of the mount.

A method according to an exemplary aspect of the present disclosure includes, among other things, positioning a conduit relative to a mount such that an upset bead of the conduit is received within a groove of the mount, and sliding a pipe retainer relative to the mount to connect the pipe retainer to the mount.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:
FIG. 2 is a perspective view of an example pipe retainer according to this disclosure.
FIG. 3 is a rear perspective view of the pipe retainer of FIG. 2.
FIG. 4 illustrates the pipe retainer in an assembled condition.
FIG. 5 illustrates an example pipe according to this disclosure.

DETAILED DESCRIPTION

Figure 1:
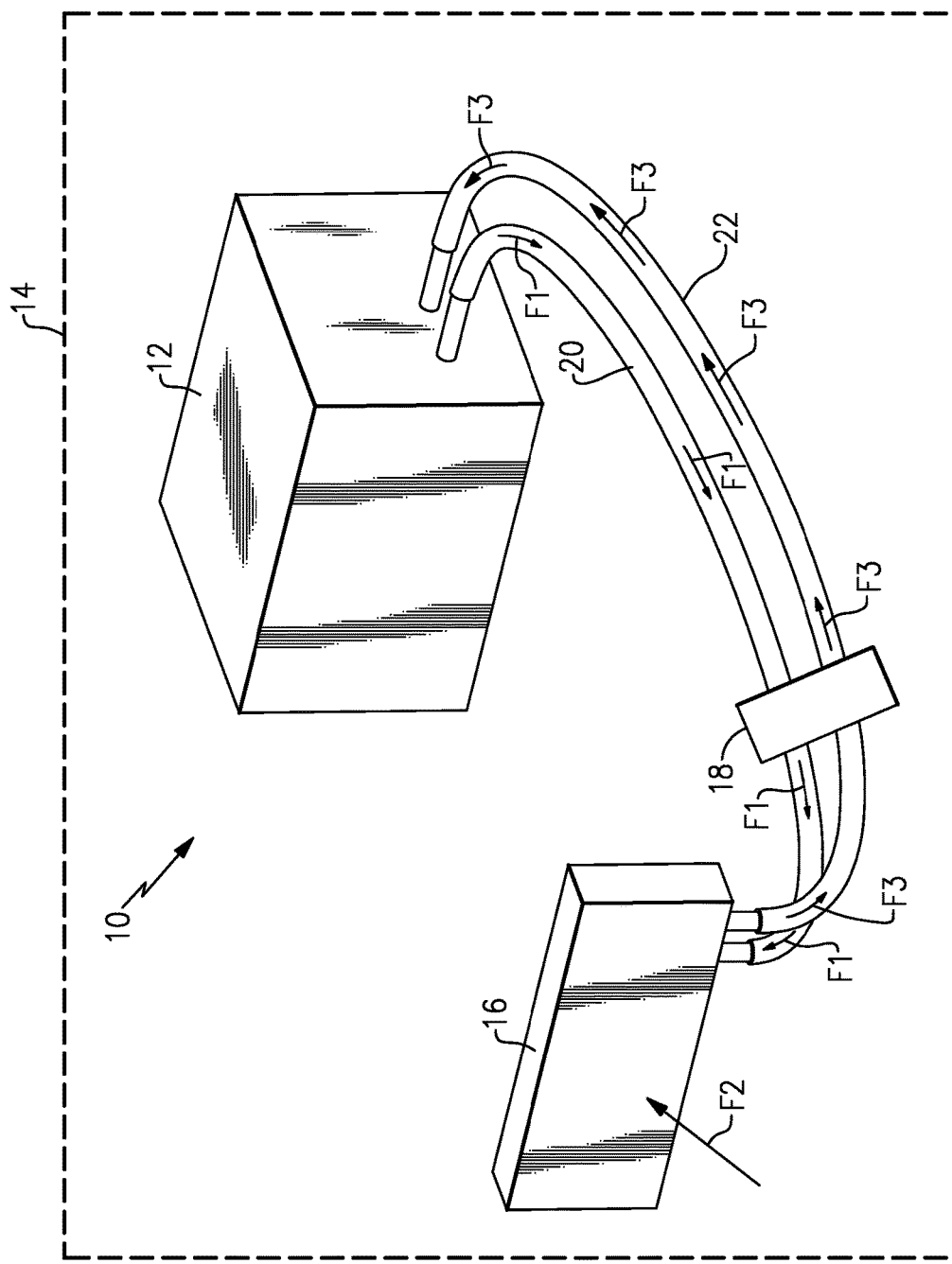
FIG. 1 schematically illustrates a vehicle system.

FIG. 1 illustrates a vehicle system 10 for thermally managing a heat source 12 of a vehicle 14. The heat source 12 could be an engine, a transmission, or any other heat generating component of the vehicle 14. The heat source 12 generates heat during operation of the vehicle 14 and therefore may need to be cooled during some conditions.

In one embodiment, the vehicle system 10 includes a heat exchanger 16 and a thermal bypass valve (TBV) 18. A TBV 18 need not be present in all examples. A supply conduit 20 and a return conduit 22 connect the components of the vehicle system 10 in a closed circuit.

In one non-limiting embodiment, the heat exchanger 16 is a transmission oil cooler configured as an air/oil heat exchanger. Other types of heat exchangers are also contemplated within the scope of this disclosure, including but not limited to, engine oil coolers or hydraulic fluid oil coolers. In addition, the heat exchanger 16 may exchange heat between any two different fluid exchange medium.

The TBV 18 can be actuated to bypass the heat exchanger 16 under certain temperature conditions if the heat transfer function of the heat exchanger 16 is not required. In one embodiment, the TBV 18 is a multi-port bypass valve. The vehicle system 10 may employ any suitable bypass valve for selectively bypassing the functionality of the heat exchanger 16.

The vehicle system 10 may communicate a fluid $F_1$ in the closed circuit. For example, the fluid $F_1$, which is relatively hot, is communicated from the heat source 12 to the heat exchanger 16 via the supply conduit 20. The fluid $F_1$ may circulate through the heat exchanger 16 to exchange heat with another fluid $F_2$, such as airflow, to provide a cooled fluid $F_3$. The fluid $F_2$ may be communicated across the heat exchanger 16 with or without the use of a fan to exchange heat with the fluid $F_1$. After exchanging heat with the fluid $F_2$, the fluid $F_1$ is returned to the heat source 12 as cooled fluid $F_3$ via a return conduit 22 to thermally manage (i.e., heat or cool) the heat source 12.

FIG. 2 illustrates an example pipe retainer assembly 24. In this example, the pipe retainer assembly 24 includes a pipe retainer 26 configured to retain the supply and return conduits 20, 22 of an example system, such as the system 10 of FIG. 1, relative to an HVAC (heating, ventilation, and air conditioning) module 28. The pipe retainer 26 may be integrally formed as one plastic piece. This disclosure is not limited to plastic, however, and extends to other types of materials.

In this example, the HVAC module 28 may be an HVAC package to be mounted on a particular vehicle. The illustrated portion of the HVAC module 28 is, in one example, mounted adjacent the front of dash (FOD) of a vehicle. This disclosure is not limited to any particular HVAC module 28, however. Further, the pipe retainer assembly 24 could be used to connect conduits to other engine components, such as the heat source 12.

The HVAC module 28 includes a mount 30, which in this example is integral to the HVAC module 28, having a first platform 32 and a second platform 34 (perhaps best seen in FIG. 3). The first and second platforms 32, 34 are spaced-apart from one another in a first direction $D_1$ (e.g., the side-to-side direction) and a second direction $D_2$ (e.g., the up-and-down, or vertical, direction) perpendicular to the first direction $D_1$.

The first platform 32 includes an upper surface 36 having a pipe locating feature 38 (FIG. 3) and a dovetail slot 40 formed therein. The pipe locating feature 38, in this example, is a groove corresponding to an upset bead 42 formed in the supply conduit 20 (FIG. 5). In this example, the upset bead 42 projects from the outer surface of the supply conduit 20, and extends around the entire perimeter (e.g., circumference) of the supply conduit 20.

The second platform 34 has an upper surface 43 that similarly includes a pipe locating feature 44, in this example a groove, and a dovetail slot 46. The pipe locating feature 44 corresponds to an upset bead 48 of the return conduit 22.

The pipe retainer 26 includes first and second dovetail projections 50, 52 configured to slide into the first and second dovetail slots 40, 46 of the platforms 32, 34. The first and second dovetail projections 50, 52 are also spaced-apart from one another in the first and second directions $D_1$, $D_2$, to correspond to the locations of the dovetail slots 40, 46. As is known of dovetail joints, the dovetail projections 50, 52 and the slots 40, 46 may be tapered to vertically maintain the position of the retainer 26 relative to the HVAC module 28. While in this example the pipe retainer 26 includes the dovetail projections 50, 52 and the platforms 32, 34 include the dovetail slots 40, 46, the pipe retainer 26 could include slots and the platforms 32, 34 could include projections. Further, this disclosure is not limited to dovetail joints, and extends to other types of joints, including joints that allow for sliding of the pipe retainer 26 relative to the mount 30 and resistance to separation in the direction perpendicular to sliding (e.g., $D_2$).

As illustrated in FIG. 4, in order to axially (e.g., see the axial direction A) maintain the retainer 26 relative to the HVAC module 28, the retainer 26 includes a latch 54 is configured to engage a latch surface 55 of a vertical wall 56 of the mount 30 between the first and second platforms 32, 34. The vertical wall 56 connects the first and second platforms 32, 34 by spanning the distance between the two platforms 32, 34. The latch 54 is configured to snap into place relative to the vertical wall 56.

In one example, the conduits 20, 22 include the upset beads 42, 48 and tapered ends 58, 60 (respectively). At the tapered ends 58, 60, the diameter of the conduits 20, 22 gradually reduce in dimension approaching the end. For installation, the retainer 26 is provided axially between the upset beads 42, 48 and the tapered ends 58, 60, and is then axially slid, along the length of the supply and return conduits 20, 22, in the axial direction A, such that the dovetail projections 50, 52 are fully received in the dovetail slots 40, 46 and such that the latch 54 engages the wall 56, as generally illustrated in FIG. 4.

The conduits 20, 22 may include an additional upset bead for retaining additional plumbing relative to the conduits 20, 22, such as under-hood plumbing. One such upset bead 57 is illustrated in FIG. 5. In that example, upset bead 57 is spaced-apart from upset bead 42 along the length of the conduit 20.

This disclosure allows for a secure retention between the conduits 20, 22 and an HVAC module 28 prior to the assembly of the HVAC module 28 relative to an vehicle instrument panel or front of dash (FOD). Further, no fasteners are required, which reduces assembly time.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A pipe retainer assembly, comprising:
   a mount including a first platform and a second platform spaced-apart from the first platform, each of the first platform and the second platform including an upper surface with a dovetail slot extending in a first direction, each upper surface defining a respective plane, each upper surface further including a groove extending in a second direction substantially normal to the first direction, the mount further including a vertical wall extending between the first platform and the second platform and defining a first vertical wall plane substantially normal to the planes defined by the upper surfaces of the first and second platforms;
   a pipe retainer including a latch, the pipe retainer including a first dovetail projection and a second dovetail projection spaced-apart from the first dovetail projection in the second direction and in a direction parallel to the first vertical wall plane, wherein the latch is provided between the first and second dovetail projections and is engaged with the vertical wall of the mount by snapping the latch into place relative to the vertical wall, wherein the latch is deflectable upon engagement with the vertical wall, and wherein the latch includes a catch at a free end thereof configured to engage a latch surface of a vertical wall of the mount, the latch surface defining a second vertical wall plane substantially normal to the first vertical wall plane and substantially normal to the planes defined by the upper surfaces of the first and second platforms; and
   a first fluid conduit and a second fluid conduit, each of the first and second fluid conduits held in place by the mount and the pipe retainer, wherein each of the first and second fluid conduits includes an upset bead received in the grooves of a respective one of the first and second platforms, and wherein the pipe retainer is configured to slide in the first direction to engage the latch with the mount.

2. The assembly as recited in claim 1, wherein ends of the first and second fluid conduits are tapered.

3. The assembly as recited in claim 1, wherein the dovetail slots and dovetail projections are tapered in a vertical direction to prevent movement of the pipe retainer in the vertical direction relative to the mount when the dovetail projections are received in the dovetail slots, and wherein the vertical direction is parallel to the first vertical wall plane.

4. The assembly as recited in claim 3, wherein the dovetail projections are tapered such that a dimension of the dovetail projections gradually increases as the dovetail projections project from the remainder of the pipe retainer.

* * * * *